No. 807,786. PATENTED DEC. 19, 1905.
G. C. SPANGLER.
BEARING ADJUSTER.
APPLICATION FILED APR. 7, 1905.

Witnesses
Chas K. Davis.
E. Annie Talbert

Inventor
Geo. C. Spangler
By Shepherd & Parker
Attorneys

UNITED STATES PATENT OFFICE.

GEORGE C. SPANGLER, OF LAGRANGE, INDIANA.

BEARING-ADJUSTER.

No. 807,786.  Specification of Letters Patent.  Patented Dec. 19, 1905.

Application filed April 7, 1905. Serial No. 254,316.

*To all whom it may concern:*

Be it known that I, GEORGE C. SPANGLER, a citizen of the United States, residing at Lagrange, in the county of Lagrange and State of Indiana, have invented certain new and useful Improvements in Bearing-Adjusters, of which the following is a specification.

My invention relates to bearing-adjusters, and has for its object to provide an inexpensive bearing-adjuster which will be automatic in its operation and of such construction as not to weaken the parts to which it is attached.

With these and other objects in view the present invention consists in the combination and arrangement of parts, as will be hereinafter more fully described, shown in the accompanying drawings, and particularly pointed out in the appended claims.

Figure 1:
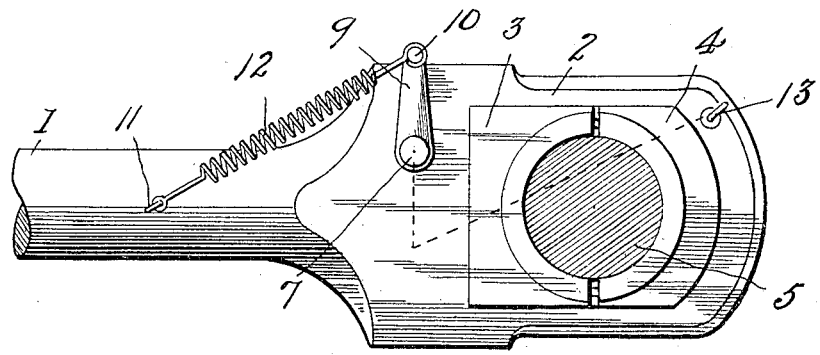
Figure 2:
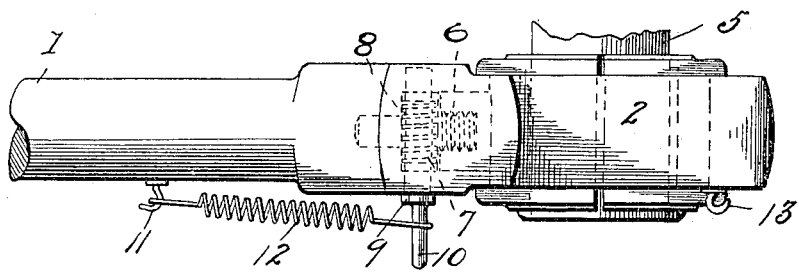
Figure 3:
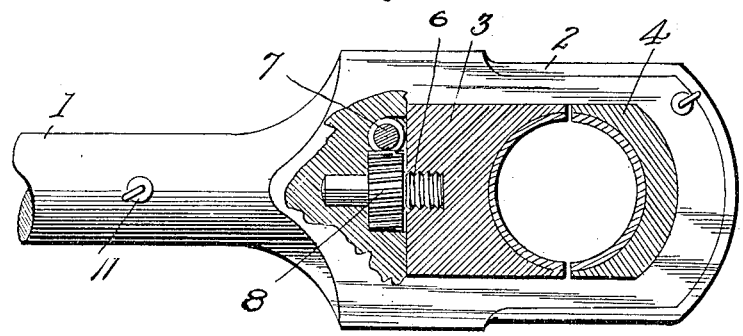
Figure 4:
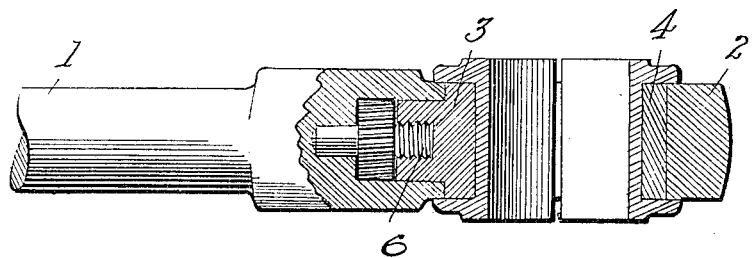

In the drawings, Figure 1 is a side elevation of a connecting-rod, showing my invention used in connection therewith. Fig. 2 is a plan view of the same. Fig. 3 is a side elevation partly broken away. Fig. 4 is a plan view partly in section.

Like reference-numerals indicate corresponding parts throughout the several views.

In the drawings, 1 indicates a connecting-rod provided with the usual straps 2. 3 and 4 are sections of a bearing-block for a wrist-pin 5. A threaded recess is provided in the rear face of block 3, into which the threaded end of shaft 6 is screwed, the other end of the shaft being journaled in connecting-rod 1. A screw 7 is mounted in the connecting-rod in a position adapted to engage worm or spur wheel 8, which is secured to shaft 6. To one end of screw 7 a crank 9 is secured, provided with a pin at its outer end. Hook 11 is fastened to the connecting-rod and engages one end of spring 12, the other end of which is loosely mounted on pin 10. The position of hook 11 is sufficiently distant from screw 7 to exert a pull upon the crank through spring 12 when the crank is at a dead-center with its outer end nearest the hook. A second hook 13 is located on the strap in a line with hook 11 and screw 7 and equidistant from the screw.

The operation of my device is as follows: Bearing-block 3, which is slidably mounted between the straps 2, is engaged by the threaded end of shaft 6. By turning crank 9 to the left screw 7 revolves worm-wheel 8, which meshes therewith and operates to withdraw the threaded end of shaft 6 from block 3. This shaft held against longitudinal movement advances block 3 toward block 4, thereby tightening the bearing. When the proper adjustment has been secured, the end of spring 12 is placed in position on hook 11. The spring serves to prevent backward movement of block 3 and automatically advances the same as needed to compensate for wear. When the crank is at a dead-center on the spring side of screw 7, the end of the spring is removed from hook 11 and placed upon hook 13, a slight forward movement of the crank being necessary to take it off of the dead-center.

While the device here shown is simple in construction, it will be found of highest efficiency and durability and in use may be relied upon for accomplishing the desired result.

Having thus described my invention, what I claim as novel, and desire to secure by Letters Patent, is—

1. In a bearing-adjuster the combination with a sectional bearing-block, of a screw-threaded shaft adapted to move one of the sections of the said bearing-block toward the other and means for rotating the said shaft, said means comprising a crank-arm and an anchored spring connected with the said crank-arm.

2. In a bearing-adjuster the combination with a sectional bearing-block, of a screw-threaded shaft adapted to move one of the sections of the said bearing-block toward the other and means for rotating the said shaft, said means comprising a shaft carrying a crank-arm, a spring connected with said crank-arm and means for anchoring the said spring at opposite sides of the shaft carrying the said crank-arm.

3. In a bearing-adjuster the combination with a sectional bearing-block, of a shaft having a threaded end engaging one of the sections thereof, a worm-wheel secured to said shaft, and a spring-rotated screw engaging said worm-wheel and adapted to impart motion thereto.

In testimony whereof I affix my signature in presence of two witnesses.

GEORGE C. SPANGLER.

Witnesses:
BEATRICE SPANGLER,
SARAH J. SPANGLER.